(12) United States Patent
Knauer et al.

(10) Patent No.: US 11,233,582 B2
(45) Date of Patent: Jan. 25, 2022

(54) LOCAL TONE GENERATION

(71) Applicant: LISNR, Inc., Cincinnati, OH (US)

(72) Inventors: William S. Knauer, Erlanger, KY (US); Rebekah L. Farrar, Columbus, OH (US)

(73) Assignee: LISNR, Inc., Cincinnati, OH (US)

( * ) Notice: Subject to any disclaimer, the term of this patent is extended or adjusted under 35 U.S.C. 154(b) by 196 days.

(21) Appl. No.: 15/081,158

(22) Filed: Mar. 25, 2016

(65) Prior Publication Data

US 2017/0279542 A1    Sep. 28, 2017

(51) Int. Cl.
*H04B 11/00* (2006.01)
*H04L 29/06* (2006.01)
*H04R 1/22* (2006.01)

(52) U.S. Cl.
CPC .......... *H04B 11/00* (2013.01); *H04L 65/1059* (2013.01); *H04L 65/4084* (2013.01); *H04R 1/225* (2013.01); *H04R 2499/11* (2013.01)

(58) Field of Classification Search
CPC .......... H04B 11/00; H04R 1/22; H04R 1/225; H04R 2499/11; H04L 29/06; H04L 65/4084; H04L 65/1059
See application file for complete search history.

(56) References Cited

U.S. PATENT DOCUMENTS

| 5,159,703 A | 10/1992 | Lowery | |
|---|---|---|---|
| 5,335,250 A | * 8/1994 | Dent | H04B 7/0857 375/224 |

(Continued)

FOREIGN PATENT DOCUMENTS

| CN | 103 023 583 B | 4/2015 |
|---|---|---|
| EP | 1758308 A1 | 2/2007 |

(Continued)

OTHER PUBLICATIONS

Chitode, J.S. Communication Theory 2002 Technical Publications. Prune. 5-28. Sec. 5-6 near 5-7 Source Coding Theorem Shannon's First Theorem). (Year: 2002).

(Continued)

*Primary Examiner* — Yuqing Xiao
*Assistant Examiner* — Amie M Ndure
(74) *Attorney, Agent, or Firm* — Wood Herron & Evans LLP

(57) ABSTRACT

A mobile device that generates and transmits a human-inaudible acoustic signal, which encodes a symbol sequence representing a binary message, for delivery as audio content, is disclosed. The mobile device encodes the binary message into a sequence of symbols that are each associated with frequency characteristics and generates and transmits the human-inaudible acoustic signal, based on the frequency characteristics of the symbols. A further mobile device that receives and decodes a human-inaudible acoustic signal, which encodes a symbol sequence representing a binary message, embedded within audio content, is disclosed. The mobile device repeatedly performs a frequency domain transformation of samples of the signal to generate a symbol sequence, and performs error correction decoding upon the symbol sequence to determine the validity of the symbol sequence. The mobile device then transmits the symbol sequence as the decoded equivalent of the human-inaudible acoustic signal, once a valid symbol sequence has been identified.

10 Claims, 7 Drawing Sheets

(56) References Cited

U.S. PATENT DOCUMENTS

| | | | |
|---|---|---|---|
| 5,485,839 A | 1/1996 | Aida et al. | |
| 5,764,763 A | 6/1998 | Jensen et al. | |
| 5,889,870 A | 3/1999 | Norris | |
| 5,923,252 A | 7/1999 | Sizer et al. | |
| 5,995,512 A * | 11/1999 | Pogue, Jr. | H04L 29/06 370/419 |
| 6,570,500 B1 | 5/2003 | Pieper | |
| 6,947,893 B1 | 9/2005 | Iwaki et al. | |
| 7,334,735 B1 * | 2/2008 | Antebi | G01S 5/22 235/492 |
| 7,904,946 B1 | 3/2011 | Chu et al. | |
| 8,140,331 B2 | 3/2012 | Lou | |
| 8,401,569 B1 | 3/2013 | Bell et al. | |
| 8,532,644 B2 | 9/2013 | Bell et al. | |
| 8,544,753 B2 * | 10/2013 | Antebi | G01S 5/22 235/492 |
| 8,711,656 B1 | 4/2014 | Paulson | |
| 8,976,959 B2 | 3/2015 | Duplan et al. | |
| 8,983,089 B1 | 3/2015 | Chu et al. | |
| 8,989,779 B1 | 3/2015 | Centore, III | |
| 9,024,998 B2 | 5/2015 | Chu et al. | |
| 9,111,326 B1 | 8/2015 | Worley, III et al. | |
| 9,213,969 B2 | 12/2015 | Arentz | |
| 9,318,166 B2 | 4/2016 | Sharon et al. | |
| 9,361,444 B2 * | 6/2016 | Antebi | G01S 5/22 |
| 9,513,861 B2 | 12/2016 | Lin et al. | |
| 9,766,702 B2 * | 9/2017 | Cieplinski | G06F 3/013 |
| 9,912,415 B2 | 3/2018 | Tsfaty et al. | |
| 10,044,448 B2 | 8/2018 | Mufti | |
| 10,826,623 B2 | 11/2020 | Prince et al. | |
| 2002/0152045 A1 | 10/2002 | Dowling et al. | |
| 2003/0206602 A1 | 11/2003 | Yamamoto | |
| 2003/0217269 A1 | 11/2003 | Gantman et al. | |
| 2004/0111360 A1 | 6/2004 | Albanese | |
| 2005/0008325 A1 | 1/2005 | Ollis et al. | |
| 2005/0177361 A1 | 8/2005 | Srinivasan | |
| 2005/0190768 A1 | 9/2005 | Cutler | |
| 2006/0041759 A1 | 2/2006 | Kaliski et al. | |
| 2006/0136544 A1 | 6/2006 | Atsmon et al. | |
| 2006/0138231 A1 | 6/2006 | Elberbaum | |
| 2007/0153091 A1 * | 7/2007 | Watlington | H04N 7/15 348/208.14 |
| 2007/0220544 A1 | 9/2007 | Nash-Putnam | |
| 2007/0272750 A1 * | 11/2007 | Bjorklund | G06F 3/03545 235/435 |
| 2008/0071537 A1 | 3/2008 | Tamir et al. | |
| 2008/0134264 A1 | 6/2008 | Narendra et al. | |
| 2008/0157938 A1 | 7/2008 | Sutardja | |
| 2008/0165022 A1 * | 7/2008 | Herz | G06F 3/017 340/669 |
| 2008/0173717 A1 * | 7/2008 | Antebi | G01S 5/22 235/439 |
| 2008/0227436 A1 | 9/2008 | Gantman et al. | |
| 2008/0228498 A1 | 9/2008 | Gasque | |
| 2009/0019061 A1 | 1/2009 | Scannell, Jr. | |
| 2009/0088133 A1 | 4/2009 | Orlassino | |
| 2009/0210789 A1 | 8/2009 | Thakkar et al. | |
| 2010/0053169 A1 | 3/2010 | Cook | |
| 2010/0165879 A1 | 7/2010 | Gupta et al. | |
| 2010/0280641 A1 | 11/2010 | Harkness et al. | |
| 2011/0029359 A1 | 2/2011 | Roeding et al. | |
| 2011/0124399 A1 | 5/2011 | Dutilly et al. | |
| 2011/0143677 A1 | 6/2011 | Jung et al. | |
| 2011/0164595 A1 | 7/2011 | So et al. | |
| 2011/0179182 A1 | 7/2011 | Vadla Ravnas | |
| 2011/0295691 A1 | 12/2011 | Krieter | |
| 2011/0301439 A1 | 12/2011 | Albert et al. | |
| 2012/0051187 A1 | 3/2012 | Paulson | |
| 2012/0064874 A1 | 3/2012 | Pierce, Jr. et al. | |
| 2012/0084131 A1 | 4/2012 | Bergel et al. | |
| 2012/0089461 A1 | 4/2012 | Greenspan | |
| 2012/0134238 A1 * | 5/2012 | Surprenant | H04S 1/007 367/137 |
| 2012/0179525 A1 | 7/2012 | Seguin et al. | |
| 2012/0197738 A1 | 8/2012 | Wakabayashi | |
| 2012/0209949 A1 | 8/2012 | Deliyannis et al. | |
| 2012/0214416 A1 | 8/2012 | Kent et al. | |
| 2012/0232906 A1 | 9/2012 | Lindahl | |
| 2012/0295560 A1 | 11/2012 | Mufti | |
| 2013/0078988 A1 | 3/2013 | Bell et al. | |
| 2013/0079057 A1 | 3/2013 | Bell et al. | |
| 2013/0106977 A1 | 5/2013 | Chu et al. | |
| 2013/0176984 A1 | 7/2013 | Koezuka | |
| 2013/0185137 A1 | 7/2013 | Shafi et al. | |
| 2013/0279300 A1 | 10/2013 | Iwase et al. | |
| 2014/0039654 A1 | 2/2014 | Akiyama et al. | |
| 2014/0045586 A1 | 2/2014 | Allen et al. | |
| 2014/0050321 A1 | 2/2014 | Albert et al. | |
| 2014/0101738 A1 | 4/2014 | Sama | |
| 2014/0129232 A1 | 5/2014 | Jones et al. | |
| 2014/0140503 A1 | 5/2014 | Duplan et al. | |
| 2014/0369527 A1 * | 12/2014 | Baldwin | H03G 7/002 381/107 |
| 2015/0113094 A1 | 4/2015 | Williams et al. | |
| 2015/0309151 A1 | 10/2015 | Shibata et al. | |
| 2016/0142157 A1 | 5/2016 | Jeong et al. | |
| 2016/0373430 A1 | 12/2016 | Bhat et al. | |
| 2018/0167147 A1 | 6/2018 | Almada et al. | |
| 2018/0329676 A1 | 11/2018 | Williams et al. | |
| 2019/0096412 A1 | 3/2019 | Knauer et al. | |
| 2019/0190621 A1 | 6/2019 | Prince et al. | |
| 2019/0268078 A1 | 8/2019 | Okunev et al. | |

FOREIGN PATENT DOCUMENTS

| | | |
|---|---|---|
| EP | 2847984 A1 | 3/2015 |
| EP | 3207639 A1 | 8/2017 |
| EP | 3358811 A1 | 8/2018 |
| JP | 06-90296 A | 3/1994 |
| JP | 2001-320337 A | 11/2001 |
| JP | 2003-1744404 A | 6/2003 |
| JP | 2003-324491 A | 11/2003 |
| JP | 2007-164659 A | 6/2007 |
| JP | 2008-293393 A | 12/2008 |
| JP | 2011-141784 A | 7/2011 |
| JP | 2012-525655 A | 10/2012 |
| KR | 10-1136279 B1 | 4/2012 |
| RU | 2326495 C2 | 6/2008 |
| WO | 2002/45273 A2 | 6/2002 |
| WO | 2005/122483 A1 | 12/2005 |
| WO | 2013/129587 A1 | 9/2013 |
| WO | 2013/166158 A1 | 11/2013 |
| WO | 2014/069617 A1 | 5/2014 |
| WO | 2014/104284 A1 | 7/2014 |
| WO | 2016/061353 A1 | 4/2016 |
| WO | 2019/067861 A1 | 4/2019 |

OTHER PUBLICATIONS

Lee et al.; Chirp Signal-Based Aerial Acoustic Communication for Smart Devices; 2015.

* cited by examiner

| FREQUENCY | 18,750 Hz | 18,850 Hz | 18,900 Hz | 19,050 Hz | 18,150 Hz | 19,200 Hz | 19,500 Hz |
|---|---|---|---|---|---|---|---|
| SYMBOL VALUE | 00 | PREFIX-LOW | 01 | 11 | PREFIX-HIGH | 10 | "SILENCE" |
| DURATION | 20 msec | 40 msec | 20 msec | 20 msec | 40 msec | 20 msec | 16 msec |
| SAMPLES AT 44.1 kHz | 882 | 1764 | 882 | 882 | 1764 | 882 | 706 |
| SAMPLES AT 48 kHz | 960 | 1920 | 960 | 960 | 1920 | 960 | 768 |

FIG. 6

| TIME | 2 msec | 20 msec | 2 msec | 16 msec |
|---|---|---|---|---|
| OPERATION | TRANSITION FROM PREVIOUS FREQUENCY TO CURRENT FREQUENCY | WRITE CURRENT SYMBOL | TRANSITION FROM CURRENT FREQUENCY TO "SILENCE" | "SILENCE" FREQUENCY 19,500 Hz |

FIG. 7

LOCAL TONE GENERATION

CROSS REFERENCE TO RELATED APPLICATION

This application is related to PCT Application Serial No. US/2013/039079 filed May 1, 2013, which was published in the United States on Apr. 23, 2015 as Publication US2015-0113094, and which claims benefit of U.S. Provisional Patent Application Ser. Nos. 61/781,107 filed Mar. 14, 2013 and 61/640,900 filed May 1, 2012, each of which is incorporated herein by reference in its entirety.

This application is also related to PCT Application Serial No. US/2015/055738 filed Oct. 26, 2015, which claims benefit of U.S. Provisional Patent Application Ser. No. 62/064,468 filed Oct. 15, 2015, which is incorporated herein in its entirety.

TECHNICAL FIELD

This application generally relates to systems and methods for delivering content from a first mobile device to a second mobile device based on one or more inaudible signals transmitted by the first device and received by the second device.

BACKGROUND OF THE INVENTION

Various proposals have been made to include inaudible signaling tones into audio content that is broadcast or played back audibly in a public or private environment, or delivered electronically. The inaudible signal is designed for reception and decoding by a decoding device, such as a portable multifunction device. For example, the inaudible signal may be embedded in audio content that is received by a microphone of the decoding device. The source of the signal may be any audio speaker within the proximity of the portable multifunction device, or the audio content may be supplied for decoding by an on-board audio generating application, such as music player module, or an on-board video player application, such as video player module, or provided to a line-out port (such as a headphone jack) of a decoding device, or provided to an external speaker of the decoding device.

Example systems and methods for embedding inaudible signals into audio content are provided in the above-referenced PCT Application, as well as the following US patent applications, the entirety of which applications is hereby incorporated by reference in their entirety: U.S. patent application Ser. No. 13/286,613 entitled "SYSTEM EFFECTIVE TO MODULATE A CODE AND PROVIDE CONTENT TO A USER" filed Nov. 1, 2011, U.S. patent application Ser. No. 13/286,670 entitled "SYSTEM EFFECTIVE TO DEMODULATE A MODULATED CODE AND PROVIDE CONTENT TO A USER" filed September Nov. 1, 2011, and U.S. patent application Ser. No. 13/286,727 entitled "DEVICE EFFECTIVE TO MODULATE A CODE AND TO PROVIDE CONTENT TO A USER" filed Nov. 1, 2011.

Inaudible signals, as described in these filings, are signals that are outside the range of human hearing or other signals not otherwise detectable by humans. For example, in some embodiments, the inaudible signal may be generated by frequencies above 20,000 Hz or less than 20 Hz, or in a frequency band near to 20,000 Hz or near to 20 Hz which is generally inaudible. The inaudible signal may be the form of a modulated code, as described in the above-reference patent applications, which is a series of logic 0s and 1s. The modulated code may be repeatedly and periodically output by the sound source, enabling the decoding device to identify and demodulate the modulated code in the inaudible signal to determine the logical series of 0s and 1s associated with the inaudible signal. In some embodiments, the logical series of 0s and 1s may be, for example, a coded identifier which can be transmitted to a content management system via various communications protocols.

As used herein, the term inaudible signal is used to broadly refer to any type of signal, code, frequency, waveform, or otherwise that may be transmitted by a source and detected by a decoding device. The inaudible signal may be processed by the decoding device by a process or routine passively running on the decoding device.

The previously described systems for producing inaudible signals have a number of limitations, specifically in the integrity of data transmission, and in the flexibility of the system to handle data efficiently, e.g., to embed data of different sizes for different applications. Thus, there is a need for an improvement in the methods of formatting and transmitting inaudible signals to allow for greater flexibility and functionality than has been previously available.

SUMMARY OF THE INVENTION

According to an embodiment, a mobile device is disclosed that is configured to generate and transmit a human-inaudible acoustic signal, which encodes a symbol sequence representing a binary message, for delivery as audio content. The mobile device comprises an audio device and a processor. The processor is configured to encode the binary message into a sequence of symbols selected from a group consisting of two or more symbols, wherein each symbol is associated with frequency characteristics.

The processor is further configured to generate audio samples of a digitized version of the sequence of symbols using the frequency characteristics associated with the symbols. The processor is further configured to control the audio device to generate and transmit the human-inaudible acoustic signal, based on the audio samples.

According to a further embodiment, a mobile device is disclosed that is configured to receive and decode a human-inaudible acoustic signal, which encodes a symbol sequence representing a binary message, embedded within audio content. The mobile device comprises an audio device and a processor. The processor is configured to control the audio device to receive samples of a digitized version of the audio content including the human-inaudible acoustic signal into the processor.

The processor is further configured to correlate the audio content within the samples with a prefix template for a prefix of the human-inaudible acoustic signal to identify candidate samples potentially associated with the start of the human-inaudible acoustic signal. The processor is further configured to repeatedly perform a frequency domain transformation of samples of the candidate samples and to compare frequency domain transformations thereof to frequency characteristics associated with two or more candidate symbols to generate a symbol sequence.

The processor is further configured to perform an error correction decoding upon the symbol sequence to determine the validity of the symbol sequence. The processor is further configured to transmit the symbol sequence as the decoded equivalent of the human-inaudible acoustic signal, once a valid symbol sequence has been identified.

BRIEF DESCRIPTION OF THE DRAWINGS

FIG. 6 illustrates the encoding between symbols and their associated frequency characteristics, according to an embodiment.

FIG. 7 provides a graphical illustration of the time dependence of a given symbol including transition intervals and a guard interval, according to an embodiment.

DETAILED DESCRIPTION OF THE INVENTION

Various non-limiting embodiments of the invention are described to provide an understanding of the principles of the structure, function, and use of the content delivery and management systems and processes disclosed herein. One or more examples of these non-limiting embodiments are illustrated in the accompanying drawings. Persons of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of this disclosure.

Reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

The embodiments disclosed herein are generally directed to data packet formats used to transmit data in an inaudible signaling tone, and the configuration of decoding devices to detect inaudible signal tones that are thus transmitted. The decoding device may be configured to then supply, e.g. wirelessly, an indication of the inaudible signal that was received to a content management system. Upon receipt of the indication of the received inaudible signal from the decoding device, the content management system may provide particular content to the decoding device based on the particular inaudible signal received, as is discussed in detail in the above-referenced prior patent filings.

In further embodiments, a first mobile device may interact directly with a second mobile device to exchange information using human-inaudible acoustic signals, as described in further detail below.

Figure 1:
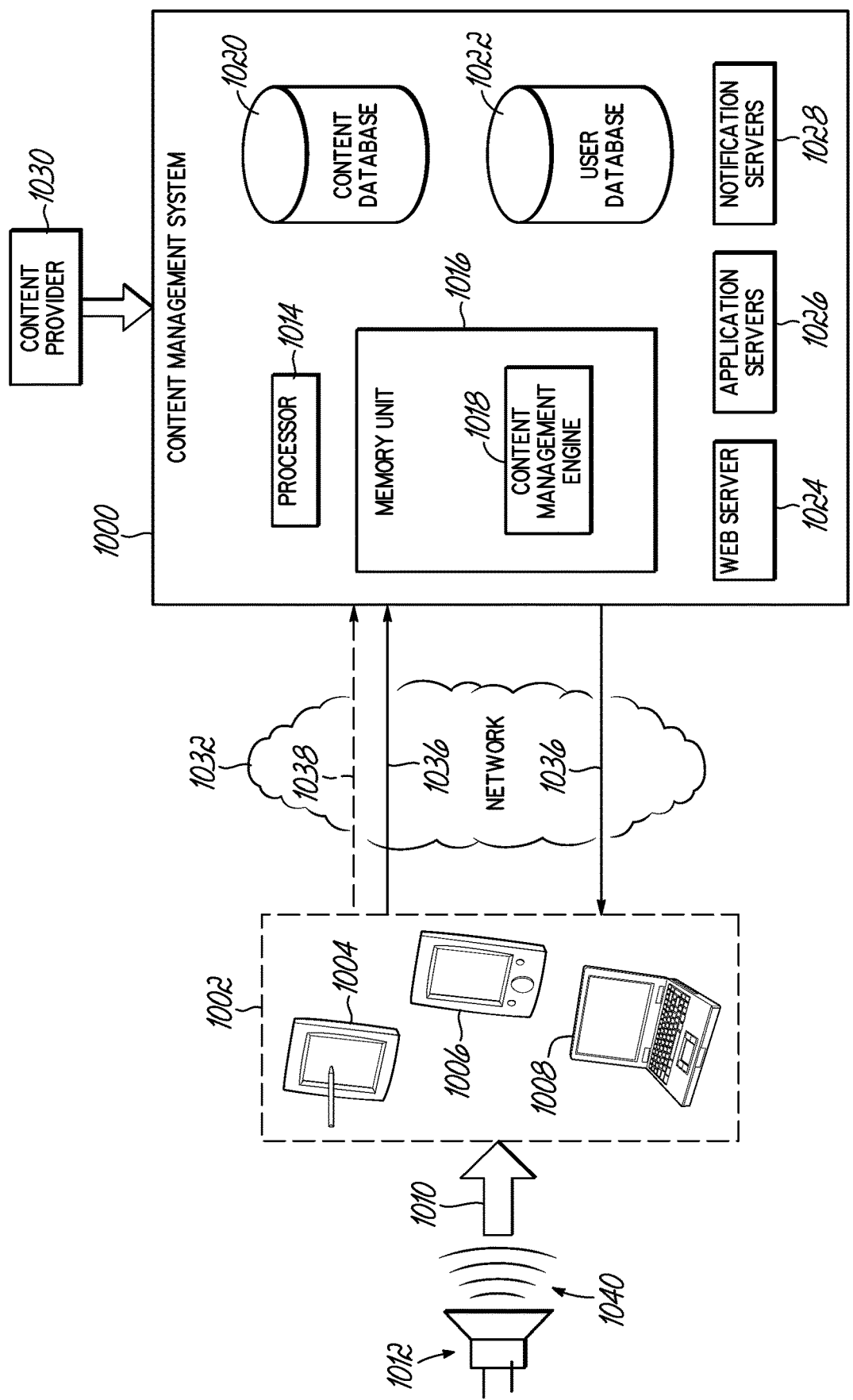
FIG. 1 is a schematic illustration of an example environment in which a mobile device receives content in the form of a human-inaudible acoustic signal and further interacts with a content management system, according to an embodiment.

FIG. 1 is a schematic illustration of an example environment in which a mobile device receives content in the form of a human-inaudible acoustic signal and further interacts with a content management system, according to an embodiment. In this embodiment, a content management system 1000 receives and processes information, associated with human-inaudible signals, that has been decoded by a decoding device. According to an embodiment, the decoding device may be a multifunction device 1002.

According to an embodiment, the content management system 1000 may then determine which content to provide to users and then wirelessly provide the content to portable multifunction devices 1002 associated with the users. The content management system 1000 may be provided using any suitable processor-based device or system, such as a personal computer, laptop, server, mainframe, or a collection (e.g., network) of multiple computers, for example. The content management system 1000 may include one or more processors 1014 and one or more computer memory units 1016. For convenience, only one processor 1014 and only one memory unit 1016 are shown in FIG. 1.

The processor 1014 may execute software instructions stored on the memory unit 1016. The processor 1014 may be implemented as an integrated circuit (IC) having one or multiple cores. The memory unit 1016 may include volatile and/or non-volatile memory units. Volatile memory units may include random access memory (RAM), for example. Non-volatile memory units may include read only memory (ROM), for example, as well as mechanical non-volatile memory systems, such as, for example, a hard disk drive, an optical disk drive, etc. The RAM and/or ROM memory units may be implemented as discrete memory ICs, for example.

The memory unit 1016 may store executable software and data for a content management engine 1018. When processor 1014 of content management system 1000 executes the software of the content management engine 1018, the processor 1014 may be caused to perform the various operations of the content management system 1000. Operations may include, without limitation, receiving an indication of an inaudible signal from a portable communication device 1002 (such as in the form of a coded identifier 1038, for example), identify content associated with the coded identifier, receive and analyze supplemental information received from the portable communication device 1002, and send content 1036 to the portable communication device 1002 via a wired or wireless communication network.

Data used by the content management engine 1018 may be from various sources, such as a content database 1020, which may be an electronic computer database, for example. The data stored in the content database 1020 may be stored in a non-volatile computer memory, such as a hard disk drive, a read only memory (e.g., a ROM IC), or other types of non-volatile memory. Also, the data of the content database 1020 may be stored on a remote electronic computer system, for example.

The data in the content database 1020 may be, without limitation, video content, audio content, text-based content, and so forth. The pieces of content in the content database 1020 may be tied to a particular coded identifier, for example. In some embodiments, a content provider 1030 may use a web portal, application program interface (API), or other form of interface to provide and manage content of the content management system 1000. For example, a content provider 1030 may provide instructions to the content management system 1000 to send content "A", "B", and "C" to portable multifunction devices 1002 that supply a coded identifier "X".

User database 1022, which may be an electronic computer database, for example, may also provide data used by the content management engine 1018. The data stored in the user database 1022 may be stored in a non-volatile computer memory, such as a hard disk drive, a read only memory (e.g., a ROM IC), or other types of non-volatile memory. Also, the data of the user database 1022 may be stored on a remote electronic computer system, for example. Data stored in the user database 1022 may be related to information regarding particular users of the content management system 1000, such as triggers, user preferences, and so forth.

Data used by the content management engine 1018 may also be obtained, for example, from a web server 1024, from application servers 1026, from notification servers 1028, and so forth.

The content management system 1000 may be in communication with portable multifunction devices 1002 via an electronic communications network 1032. The communications network may include a number of computer and/or data networks, including the Internet, LANs, WANs, GPRS networks, etc., and may comprise wired and/or wireless communication links. The portable multifunction devices 1002 that communicate with the content management system 1000 may be any type of client device suitable for communication over the network, such as a personal computer, a laptop computer, or a notebook computer, for example.

In some example embodiments, a user may communicate with the network 1032 via a portable multifunction device 1002 that is a combination handheld computer and mobile telephone, sometimes referred to as a smart phone 1006. It can be appreciated that while certain embodiments may be described in connection with user communication via a smart phone 1006 or laptop 1008 by way of example, the communication may be implemented using other types of user equipment or wireless computing devices such as a mobile telephone, personal digital assistant (PDA), combination mobile telephone/PDA, handheld device, mobile unit, game device, messaging device, media player, or other suitable mobile communications devices.

According to an embodiment, example portable multifunction devices 1002 may include, for example, a tablet computer 1004, a smart phone 1006, and a laptop 1008. Other types of portable multifunction devices may be used as would readily be understood by persons of ordinary skill in the art.

Some of the portable multifunction devices 1002 also may support wireless wide area network (WWAN) data communications services including Internet access. Examples of WWAN data communications services may include Evolution-Data Optimized or Evolution-Data only (EV-DO), Long Term Evolution (LTE), Evolution For Data and Voice (EV-DV), CDMA/1×RTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others. Multifunction device 1002 may provide wireless local area network (WLAN) data communications functionality in accordance with the Institute of Electrical and Electronics Engineers (IEEE) 802.xx series of protocols, such as the IEEE 802.11a/b/g/n series of standard protocols and variants (also referred to as "Wi-Fi"), the IEEE 802.16 series of standard protocols and variants (also referred to as "WiMAX"), the IEEE 802.20 series of standard protocols and variants, and others.

In some example embodiments, the portable multifunction devices 1002 also may be arranged to perform data communications functionality in accordance with shorter range wireless networks, such as a wireless personal area network (PAN) offering Bluetooth® data communications services in accordance with the Bluetooth®. Special Interest Group (SIG) series of protocols, specifications, profiles, and so forth. Other examples of shorter range wireless networks may employ infrared (IR) techniques or near-field communication (NFC) techniques and protocols, such as electromagnetic induction (EMI) techniques including passive or active radio-frequency identification (RFID) protocols and devices.

The portable multifunction device 1002 may provide a variety of applications for allowing a user to accomplish one or more specific tasks using the content management system 1000. The portable multifunction device 1002 may comprise various software programs such as system programs and applications to provide computing capabilities in accordance with the described embodiments.

System programs may include, without limitation, an operating system (OS), device drivers, programming tools, utility programs, software libraries, application programming interfaces (APIs), and so forth. As is to be appreciated, the portable multifunction device 202 may include any suitable OS, such as a mobile OS (ANDROID, BLACKBERRY OS, iOS, SYMBIAN OS, WINDOWS PHONE, and so forth), a desktop OS (MAC OS X, LINUX, WINDOWS, GOOGLE CHROME OS, and so forth) or a television OS (GOOGLE TV, APPLE TV, or other Smart TV OS), for example.

Other decoding devices, such as stationary devices connected to AC mains power and wired networks, are also contemplated and within the scope of principles of the invention.

In various embodiments, a decoding device may detect the inaudible signal through a generally passive detection process. In other words, a user of the decoding device does not necessarily have to routinely initiate or activate the detection process. Instead, the detection process may be a background routine that operates in the random access memory (RAM) of a decoding device, for example. The background routine may periodically, or at least routinely, query signals received or generated by various on-board components of the decoding device in order to detect if an inaudible signal is present. These queries may be performed without additional input from the user. Components queried by the detection process may include, without limitation, on-board microphones, on-board speakers, and other audio output ports (such as a headphone output or a line level output, for example).

The inaudible signal may be received by the decoding device from any suitable source. For example, the inaudible signal may be embedded in audio content that is received by a microphone of the decoding device. In this regard, the source may be any audio speaker within the proximity of the decoding device. The audio content may also be supplied by an on-board audio generating application, such as music player module, or an on-board video player application, such as video player module, or provided to a line-out port (such as a headphone jack) or an external speaker of the decoding device.

Upon detecting an inaudible signal, the decoding device may process the inaudible signal to extract a coded identifier. The extraction process may be a generally passive process which may be performed by the processor of the decoding device. In some embodiments, the coded identifier may then be provided to a content management system 1000 via a wireless communication network 1032. Supplemental information may also be provided to the content management system 1000 along with the coded identifier, such as a time/date data, accelerometer data, geographic data, demographic data, device data, owner data, and so forth.

The content management system 1000 may process the received information to identify content to transmit to the decoding device. The content may be stored locally to the content management system or may be stored in data stores remote from the content management system. The content may be in any suitable file format or file type. A non-limiting and non-exhaustive list of example content that may be provided to a decoding device includes video-based content, audio-based content, image-based content, and text-based content.

Video-based content may include, without limitation, concert footage, music videos, artist interviews, movies, commercials and so forth. Audio-based content may include, without limitation, songs, ringtones, and so forth. Image-based content may include, without limitation, pictures, logos, wallpapers, and so forth. Text-based content may include, without limitation, lyrics, quotes, coupons, passwords, passcodes, email messages, text messages, instant messages, and so forth. Text formats may also include hyperlinks and formatted data such as JSON and XML. In some embodiments, the content may be advertisements or educational in nature. This disclosure is not limited to any particular content which may be delivered to decoding devices associated with the content management system.

In various embodiments, the particular content delivered to a decoding device may be based on the coded identifier and one or more triggers. Over time additional content may be accessible (unlocked) as the decoding device, or user of the device, satisfies various thresholds. For example, the number of times a particular inaudible signal has been received by the device may determine which content is sent to the device. If the inaudible signal is embedded in a song, the number of times the inaudible signal is received may indicate the number of times the song has been listened to by a user associated with the device. As the user listens to the song more and more, additional content ("unlocked content") may be delivered to that user's device.

Additional content may be labeled or otherwise considered as "exclusive" content that is only available to certain types or groups of listeners. For example, an inaudible signal may be broadcast at a music venue while an artist is performing a concert. Audience members having devices passively detecting for inaudible signals will receive and process the inaudible signal. The device may then extract the coded identifier and provide the information to a content management system 1000 via a wireless communications network 1032. The content management system 1000 may match the coded identifier to stored content associated with the performing artist. The content may then be pushed to the decoding device 1002 that originally sent the coded identifier. The user will then be able to access the content via their decoding device. Thus, in the illustrated embodiment, the decoding device passively detected the inaudible signal, extracted the coded identifier, transmitted the coded identifier and received affiliated content without any input or interaction from a user.

In some embodiments, the particular content delivered to a decoding device may be function of where the device is geographically located. In other words, decoding devices in a first city that passively detect a certain inaudible signal may receive a first piece of content while decoding devices in a second city that detect the same inaudible signal may receive a second piece of content. Additionally, the content delivered to the decoding device may depend on other triggers, such as whether the decoding device is moving (in a car), the time of day, user preferences, and so forth.

The content received by the decoding device may be stored, arranged, and viewed in any suitable configuration. The content may be viewed at the time of receipt or at a later point in time. In one embodiment, content is delivered to an electronic mailbox associated with the user. In one embodiment, content is delivered to an application or module that is executable by the decoding device. A user can execute the application and access the content. Content can be sorted in any suitable hierarchy or schema.

In some embodiments, "locked" content may be displayed to the user through the application. In order to unlock the content, the user must, for example, satisfy certain parameters or thresholds. The thresholds may relate to a total number of listens, a geographic location, and so forth. In any event, when content is received by the decoding device, a notification may be provided to the user by the decoding device. In one embodiment, upon receiving the notification, the user can then navigate the associated application to view the content received.

Inaudible signals 1040 may, in one embodiment, be embedded in audio songs. The disclosure herein, however, is not so limited. In fact, the systems and methods described herein may be used across a wide variety of platforms and implementations. For example, the passive detection routines described herein can be used to detect inaudible signals 1040 associated with television shows, commercials, movies, and the like. In some embodiments, the passive detection routines described herein can be used to detect stand-alone inaudible signals 1040 that are not embedded in audio signals. Such stand-alone inaudible signals may be transmitted in, for example, commerce/shopping environments, business environments, music venues, entertainment venues, or any other suitable environments or venues.

A decoding device may also be configured to transmit 1010 inaudible signals 1040 using its on-board speaker 1012, for example. The inaudible signal 1040 may be received and processed by other decoding devices 1002 positioned proximate the transmitting decoding device. Upon passively detecting the inaudible signal and providing an indication of the inaudible signal to a content management system, particular content can be delivered to the decoding device in accordance with the systems and methods described herein.

Figure 2:
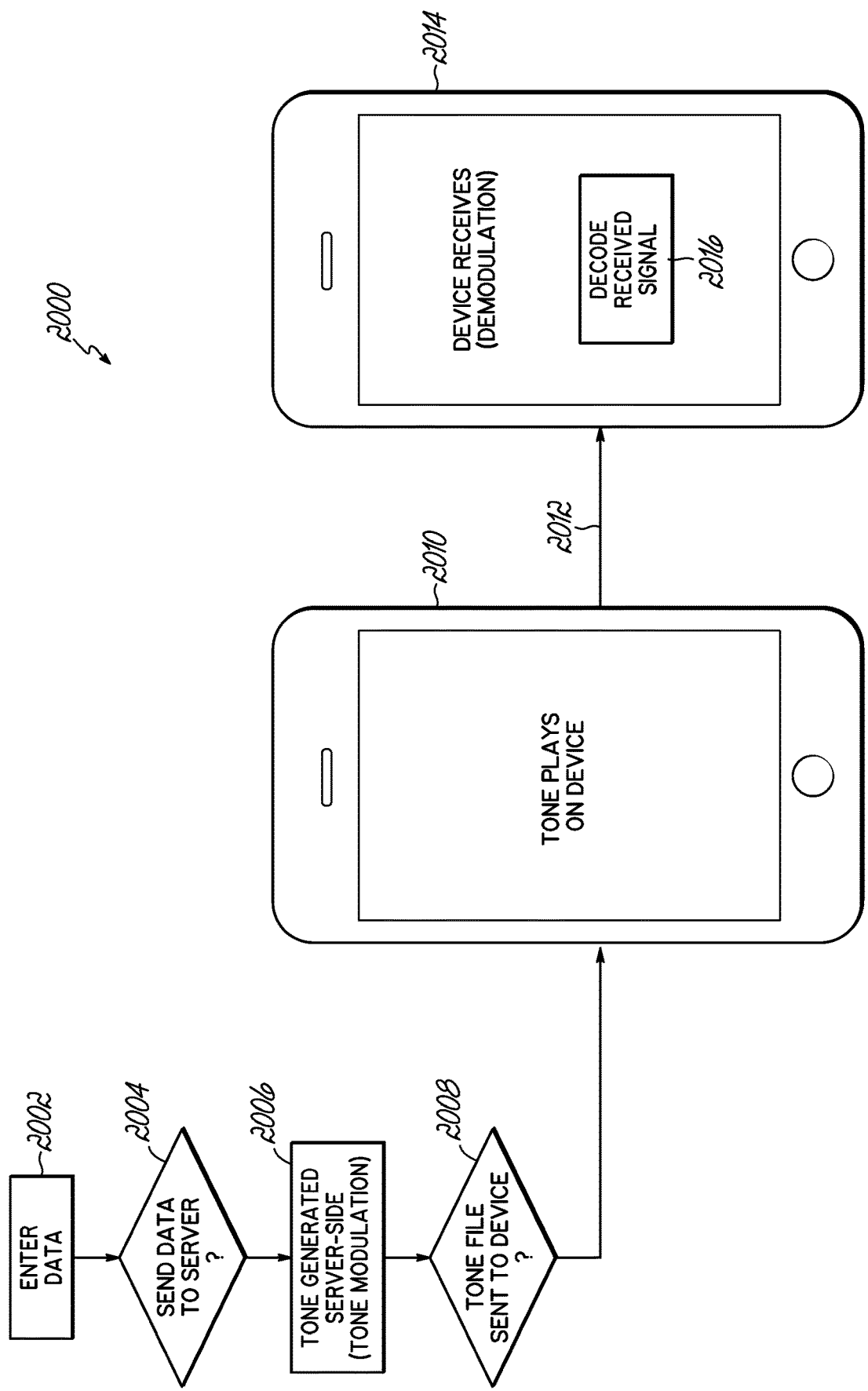
FIG. 2 is a flow chart illustrating a method by which a human-inaudible tone may be generated and passed to a mobile device using a server and a data connection, according to an embodiment.

FIG. 2 is a flow chart 2000 illustrating a process by which a message may be encoded as a sequence of human-inaudible tones and passed to a mobile device using a server and a data connection, according to an embodiment. In this example, in stage 2002, a user may enter data using a mobile or standalone device. In other embodiments, data may be obtained from a storage device. In stage 2004, the data may be sent to a server. In stage 2006, the server may receive the data and use it to encode the message as a symbol sequence representing a binary message for delivery as audio content.

In this example, the binary message is encoded into a sequence of symbols selected from a group consisting of two or more symbols, wherein each symbol is associated with frequency characteristics. The server may then generate audio samples of a digitized version of the sequence of symbols using the frequency characteristics associated with the symbols. The audio samples may then be stored in memory and/or transmitted to a mobile device. In some embodiments, the audio samples may be stored in a tone file, which is a file with an audio stream containing modulated audio data packets.

In stage 2008 a tone file generated by the server may be sent to another device. The tone file may be sent by a wired or wireless connection to the other device. In an embodiment, the other device may be a first mobile device 2010. The first mobile device 2010 may then generate a human-inaudible acoustic signal, based on the audio samples, and transmit 2012 the human-inaudible acoustic signal, using an audio device associated with the first mobile device 2010.

According to an embodiment, the human-inaudible acoustic signal that is generated and transmitted 2012 by the first mobile device 2010 may then be received by a second mobile device 2014. The second mobile device 2014 may receive the human-inaudible acoustic signal using a microphone or other acoustic signal detection device associated with the second mobile device 2014. The second mobile device 2014 may then decode 2016 the human-inaudible acoustic signal that is received from the first device 2010, as described in further detail below.

In the above-described embodiment, the audio samples are generated by the server and may be stored as a tone file. The tone file may then be sent to the first mobile device. In practice, however, the tone file may be so large that sending it to the first mobile device may not be practical. Therefore, it may be more efficient for the first mobile device 2010 to directly generate the audio samples rather than receiving them from the server.

To solve this problem, in a further embodiment, the first mobile device 2010, may generate the audio samples of the digitized version of the sequence of symbols representing the binary message, based on information received by the first mobile device 2010 from the server. In this embodiment, the server may determine what information is to be used to generate the audio samples and may communicate this information to the first mobile device 2010. However, in this embodiment, the server does not generate the audio samples.

Figure 3:
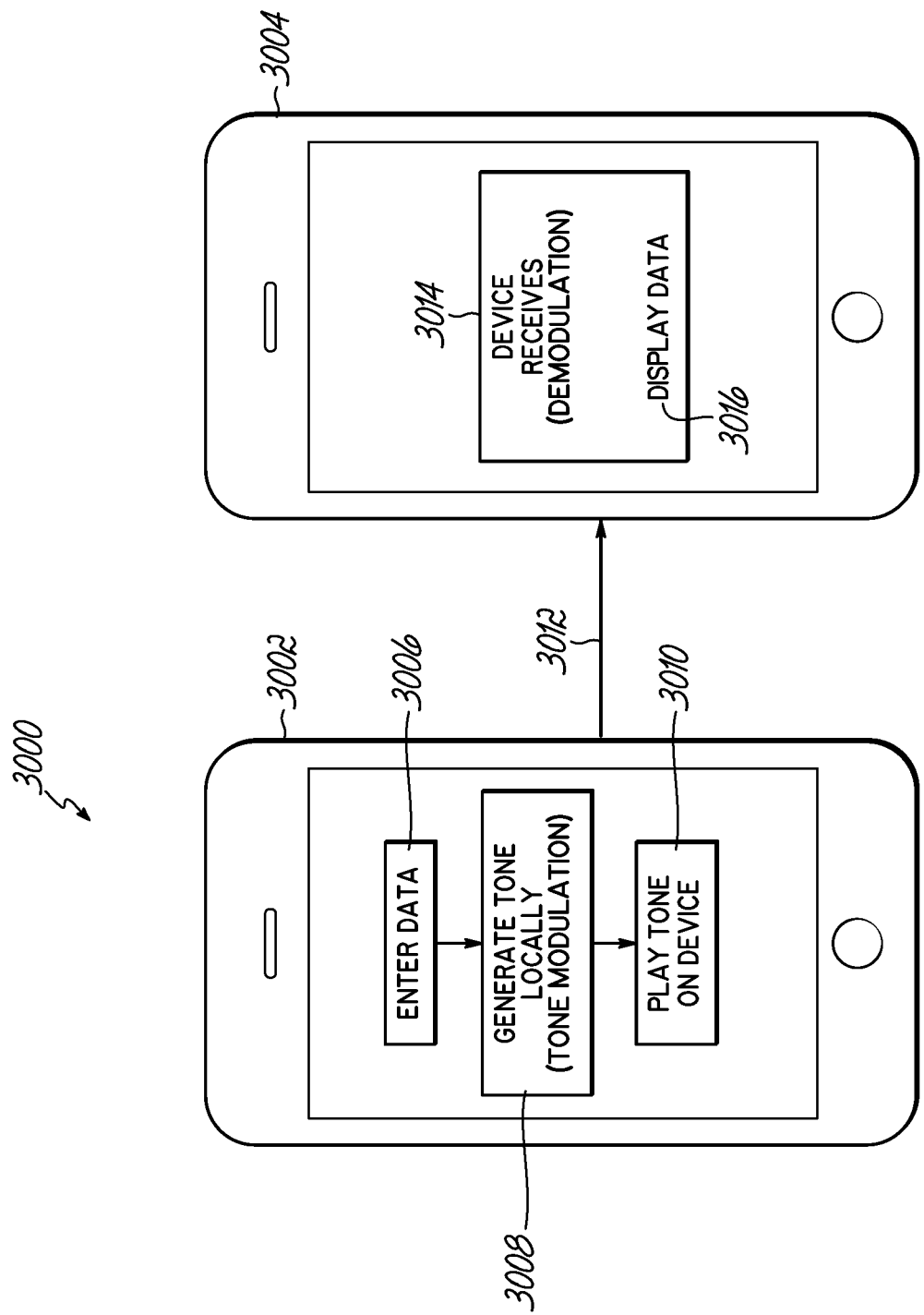
FIG. 3 is a flow chart illustrating a method by which a human-inaudible tone may be generated by a first mobile device and passed to a second mobile device, according to an embodiment.

FIG. 3 is a flow chart 3000 illustrating a method by which a human-inaudible tone may be generated by a first mobile device 3002 and passed to a second mobile device 3004, according to an embodiment. In this example, a first device 3002 may interact with a second device 3004 by sending and receiving messages encoded as human-inaudible acoustic signals. In this example, in stage 3006, a user may enter data using a user interface that is provided by the first mobile device 3002.

According to an embodiment, the first device 3002 may use the data to encode a binary message into a sequence of symbols selected from a group consisting of two or more symbols, wherein each symbol is associated with frequency characteristics. In stage 3008, the first mobile device 3002 may then generate audio samples of a digitized version of the sequence of symbols using the frequency characteristics associated with the symbols. The audio samples may then be stored in memory and/or transmitted to the second mobile device 3004. In some embodiments, the audio samples may be stored in a tone file.

According to an embodiment, in stage 3010, the first mobile device 3002 may then generate a human-inaudible acoustic signal, based on the audio samples, and in stage 3012, transmit the human-inaudible acoustic signal, using an audio device associated with the first mobile device 3002.

According to an embodiment, the human-inaudible acoustic signal that is generated 3008 and transmitted 3012 by the first mobile device 3002 may then be received by a second mobile device 3004. In stage 3014, the second mobile device 3004 may receive the human-inaudible acoustic signal using a microphone or other acoustic signal detection device associated with the second mobile device 3004. The second mobile device 3004 may then decode the human-inaudible acoustic signal that is received from the first device 3002, as described in further detail below. According to an embodiment, in stage 3016, the second device 3004 may display data associated with the received message. In further embodiments, the second mobile device 3004 may perform other operations based on the received message, as would be readily apparent to persons of ordinary skill in the art.

Figure 4:
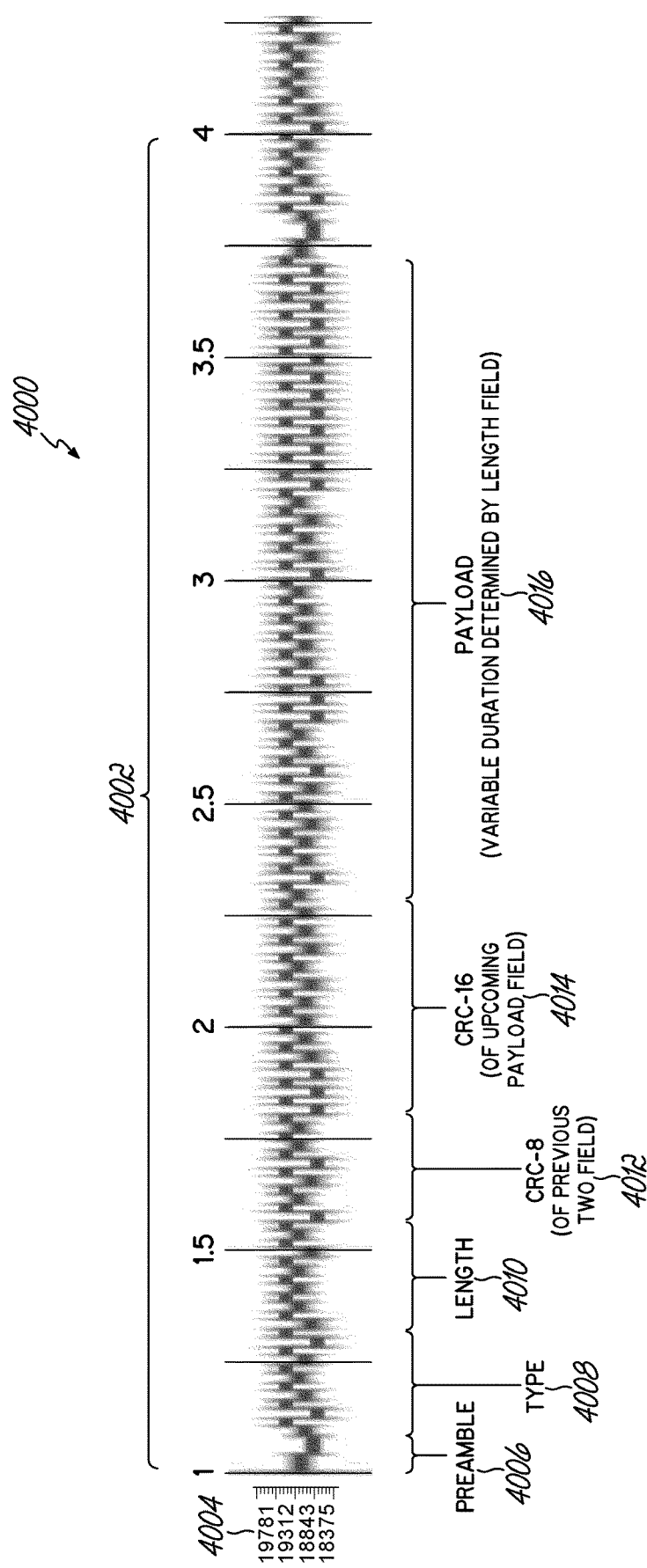
FIG. 4 provides a graphical representation of an example human-inaudible acoustic signal that encodes a symbol sequence representing a binary message, according to an embodiment.

FIG. 4 provides a graphical representation 4000 of an example human-inaudible acoustic signal 4002 that encodes a symbol sequence representing a binary message, according to an embodiment. The graphical representation 4000 is a plot of frequency vs. time of an example human-inaudible acoustic signal 4002. In this representation, the vertical axis represents frequency that is divided into discrete bins 4004. Similarly, the horizontal axis represents time that is divided into discrete time samples.

According to an embodiment, a binary message is encoded as a sequence of symbols selected from a group consisting of two or more symbols, wherein each symbol is associated with frequency characteristics, as described in greater detail below. The human-inaudible acoustic signal 4002 is generated as a sequence of audio samples of a digitized version of the sequence of symbols.

The format of the symbol sequence associated with the human-inaudible acoustic signal 4002 is illustrated schematically below the signal 4002. The symbol sequence includes symbols representing a preamble 4006, symbols representing a message type 4008, symbols representing a length 4010 of the message, symbols representing a cyclic redundancy check 4012 of the previous two fields, symbols representing a cyclic redundancy check 4014 of the upcoming payload, and symbols representing the payload 4016. According to an embodiment, the payload may be of variable length, wherein the number of symbols associated with the payload 4016 is designated by the length field 4010. Further details of the symbol sequence format, according to an embodiment, are provided below.

Figure 5:
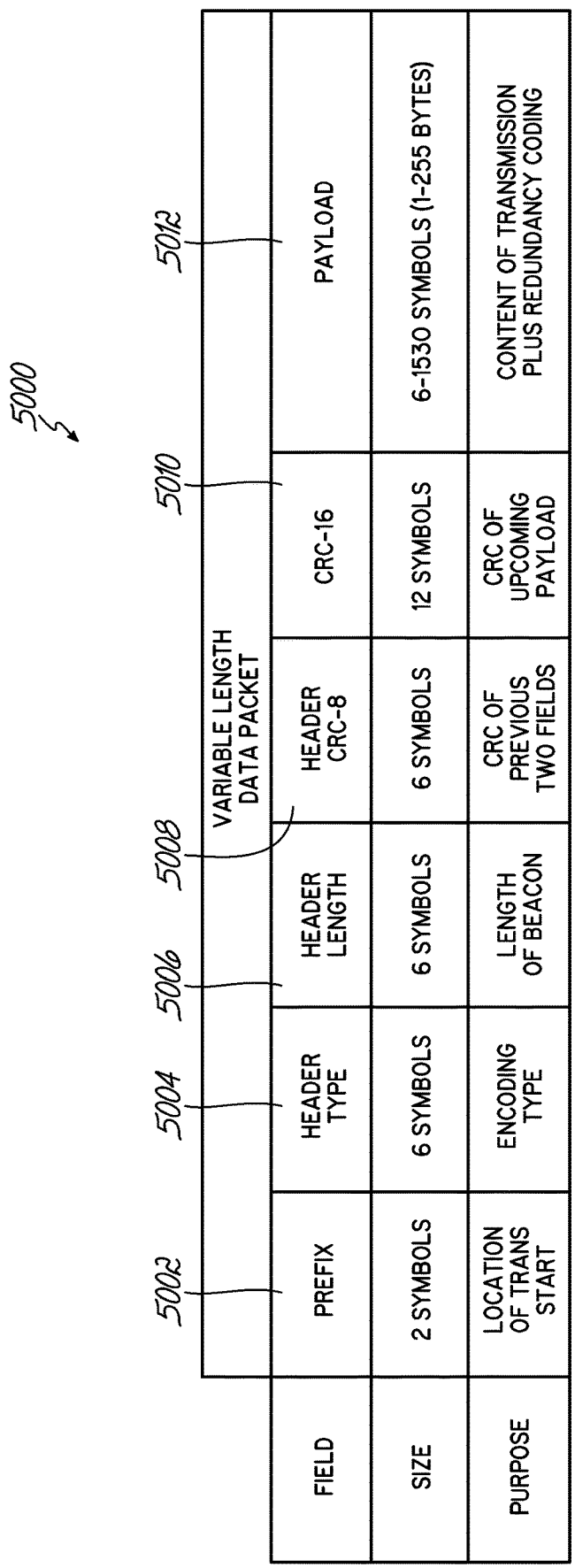
FIG. 5 is a graphical illustration providing further details of the symbol sequence illustrated in FIG. 4, according to an embodiment.

FIG. 5 is a table 5000 providing further details of the symbol sequence illustrated in FIG. 4, according to an embodiment. In this example, table 5000 represents the format of a symbol sequence corresponding to a data packet. Data packet 5000 uses a variable length data transmission format that is suitable for an inaudible transmission. This format constitutes between 38 and 1562 transmitted symbols, each symbol comprising 40 milliseconds of radiated sound, for a total iteration length of between 1.52 and 62.48 seconds. The full set of symbols illustrated in FIG. 5 will hereafter be referred to as a data packet 5000.

According to an embodiment, symbols associated with the prefix, header, CRC, and payload may comprise two binary bits. Within the data packet 5000, the first two symbols 5002 are a static beginning sequence that is used to locate the start of the transmitted data packet. The next six symbols 5004 provide an 8-bit value that identifies an encoding type used by the data packet. This information enables future modification of the encoding method of the data packet while maintaining reverse compatibility.

The next six symbols in the data packet 5000 comprise a header length field 5006 indicating the length of the payload, which in this embodiment is a number of bytes between 1 and 255, which requires, between 6 and 1530 symbols using the encoding methods of this example. The header length field 5006 may, for example, comprise six symbols or 12 bits, which encode an 8-bit value between 1 and 255 representing the length (in bytes) of the payload. This 8 bit value may, for example, be encoded in 12 bits using a 2/3 error correcting code.

Immediately following the header length field 5006 are six symbols that comprise a first header cyclic redundancy check (CRC-8) field 5008, including redundancy bits providing redundancy for the header type field 5004 and header length field 5006. Error correcting coding uses a 2/3 cyclic redundancy encoding, providing a high level of data integrity, which is important to this format particularly because inaccurate payload length information can cause the erroneous loss of many payloads.

Immediately following the CRC-8 field 5008 are twelve symbols that comprise a cyclic redundancy check (CRC-16) field 5010 for the upcoming payload. The twenty four bits that make up the twelve symbols 5010 provide a sixteen bit CRC for the payload using rate 2/3 convolutional error correction coding. The use of the sixteen bit CRC 5010 provides a high level of data integrity for the payload.

Following the header fields 5002, 5004, 5006, 5008, and 5010, is the payload 5012 which, as noted, encodes a payload of between 1 and 255 bytes, using between 6 and 1530 symbols. Each symbol is encoded according to its associated frequency characteristics, as described in the following.

FIG. 6 illustrates an encoding 6000 between symbols and their associated frequency characteristics, according to an embodiment. Each symbol comprises a number of samples of audio data at a predetermined sampling rate, generating an audio tone in the frequency range between 18,750 Hz-19,500 Hz, which is generally inaudible to humans. Symbols 6002, 6006, 6008, and 6012 each comprise 882 samples of audio data at a 44.1 kHz sample rate, or 960 samples of audio data at a 48 kHz sample rate, generating an audio tone over a period of 20 milliseconds. Symbols 6004 and 6010 each comprise 1764 samples of audio data at a 44.1 kHz sample rate, or 1920 samples of audio data at a 48 kHz sample rate, generating an audio tone over a period of 40 milliseconds. Symbol 6014 is used as a frequency to denote "silence" to act as a guard interval between symbols, as described in further detail below. Symbol 6014 comprises 706 samples of audio data at a 44.1 kHz sample rate, or 768 samples of audio data at a 48 kHz sample rate, generating an audio tone for period of 16 milliseconds.

Symbols 6002, 6006, 6008, and 6012 are used to encode 2-bit values ranging from 00 to 11. The data value represented by symbols 6002, 6006, 6008, and 6012 is indicated by the specific audio frequency encoded into the 882/960 samples of the symbol. In one embodiment, each symbol encodes a 2-bit value, and four such 2-bit values ranging from 00 to 11 are encoded by symbols using the frequencies 18,750 Hz (6002), 18,900 Hz (6006), 19,050 Hz (6008) and 19,200 Hz (6012). Notably, the symbol values are encoded in the sequence 00, 01, 11, 10, so that the Hamming distance between symbols using adjacent frequencies is only 1 bit, which increases the error correction effectiveness. Specifically, a miss-decode into an immediately adjacent frequency will cause only a one bit miss-decode of the symbol, whereas due to the error correction coding uses, two bit errors are required in a symbol to cause a miscode.

Symbols 6004 and 6010 are used to encode symbol values which are used only in the prefix field 5002 (see FIG. 5), thus aiding in the separate detection of prefixes. The 18,850 Hz frequency is used for a "prefix-low" symbol and the 19,150 Hz frequency is used for a "prefix-high" symbol. Symbol 6014 is used to represent "silence" so as to act as a guard interval between symbols, as described in further detail below.

FIG. 7 provides a graphical illustration 7000 of the time dependence of a given symbol, associated with the header or payload, including transition intervals and a guard interval, according to an embodiment. A first two millisecond transition interval 7002 is provided between symbols. During interval 7002 a smooth transition from the previous symbol to the current symbol is provided. The time dependence of the interval 7002 and the functional form of the time dependent frequency change is chosen so that the transition between symbols will not introduce frequency harmonics that are audible to humans.

In this example, the current symbol is written during a 20 millisecond time interval 7004 following transition interval 7002. The signal provided during interval 7004 corresponds to audio data at one of the frequencies corresponding to symbols 6002-6012. As discussed above, symbols 6002, 6006, 6008, and 6012 are used to encode binary values 00, 01, 11, and 10, respectively, and symbols 6004 and 6010 are used in prefix fields.

In this example, a second two millisecond interval 7006, following interval 7004, is provided. This second interval 7006 provides a similar smooth time dependent frequency transition between the symbol being written during interval 7004 and a guard interval 7008. The data provided during the guard interval 7008 corresponds to the "silence" frequency of symbol 6014 discussed above and illustrated in FIG. 6. The guard interval is used to avoid errors that may arise due to acoustic reflections that might otherwise cause errors due to multi-path interference. The informal term "silence" is used to express the fact that the frequency of the guard interval 7008 is not associated with any data value or with frequencies associated with the prefix. In this sense, the data provided during the "silence" interval 7008 is simply ignored and provides a 16 millisecond time delay to allow potential error causing acoustic reflections to sufficiently diminish.

According to an embodiment, the time dependence illustrated in FIG. 7, and discussed above, corresponds to the transmission of symbols associated with the header and payload. In contrast, symbols associated with the preamble (e.g., symbols 6004 and 6010) last for a duration of 40 milliseconds and include a 2 millisecond transition interval (e.g., 96 samples at a 48 KHz sample rate) but do not include a silence interval. Thus, the complete preamble includes two transition intervals because the preamble comprises two symbols.

Figure 8:
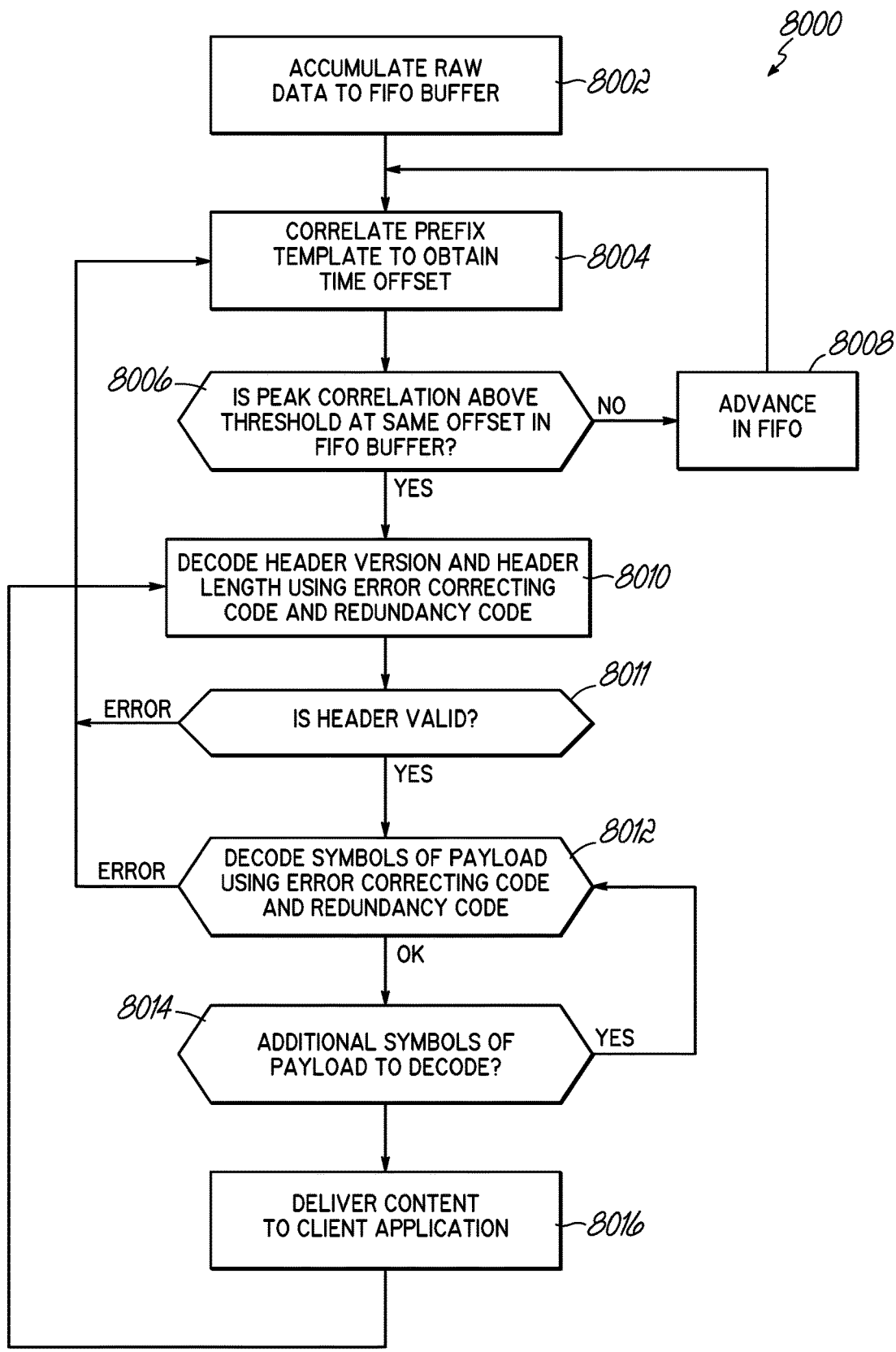
FIG. 8 is a flow chart describing a method to decode a variable-length data packet, according to an embodiment.

FIG. 8 is a flow chart 8000 describing a method of decoding a variable length data packet, according to an embodiment. A human-inaudible acoustic signal 4002, as illustrated in FIGS. 4-8, is often called pulse code modulated (PCM) data. In a first stage 8002, raw PCM data is received by a microphone or other audio receiving device. The received raw PCM data is stored in an internal "first in first out" (FIFO) buffer.

According to an embodiment, in stage 8002, PCM data is accumulated in the FIFO buffer until a sufficient amount of data is available to begin analyzing the data to search for a data packet header. In stage 8004, a prefix template corresponding to a prefix used by transmitted data packet is correlated to data in the FIFO, to attempt to identify the beginning location of a data packet. In stage 8006, the location (e.g., a time offset) in the FIFO which correlates best to the prefix template is identified, and the peak correlation at that locate is compared to a threshold. In stage 8008, if the threshold is not met, then the data in the FIFO is deemed to not include a header, and the FIFO is advanced. If, however, the peak correlation to the prefix template exceeds the threshold for recognition, then in stage 8010 a process is initiated to decode the symbols of the header.

According to an embodiment, the process initiated in stage 8010 determines time offsets associated with symbol boundaries. In stage 8010, symbol boundary offsets are used to decode the header to obtain a type and header length identifying the number of bytes in the payload following the header.

According to an embodiment, the six symbols representing the header type 5004, the six symbols representing the header length 5006, and the six symbols representing the header CRC-8 5008, are convolutionally encoded together as eighteen symbols that logically represent the header. As such, during decoding in stage 8010, the eighteen symbols of the header are decoded as a single logical unit.

According to an embodiment, in stage 8010, the eighteen symbols of the header are decoded using a Viterbi decoder (or other decoder, such as Fano) yielding 3 bytes, which represents the entire content of the header. The first byte (representing the type) and the second byte (representing the length) are used to generate an eight-bit CRC value by the same algorithm that that was used to generate the third byte CRC-8 value 5008. At stage 8011 a test is performed to determine whether or not the generated CRC value matches the decoded value 5008. An error state is reached, when the generated CRC value and the decoded value 5008 do not match. When this occurs, the process bypasses stage 8012 and no attempt is made to decode a payload.

When an error state is reached (e.g., because there is a faulty header description) the process aborts from stage 8011 and returns to stage 8004 and resumes searching for prefixes, without loss of data from the FIFO buffer. According to a further embodiment, an error state may be reached when the type byte does not match a known type, thus providing a further criterion for bypassing stage 8012 (payload decode) and returning to stage 8004 (searching for preambles).

In stage 8012, symbols may be decoded from the payload, using error correcting coding and redundancy codes to correct errors. According to an embodiment, the portion of the data packet following the header section (i.e., the symbols representing the CRC-16 5010 and the payload 5012) is convolutionally encoded as one stream (i.e., encoder memory registers are not reset between CRC-16 and payload) so all symbols in the packet following the header are decoded as such. After demodulating and convolutionally decoding the CRC-16 5010 and payload 5012, a CRC-16 value is generated from the payload 5012 similarly to the way in which the CRC-8 of the header is generated from the header. An error state is reached when the decoded CRC-16 and the generated one do not match. When such an error state is reached, the process aborts from stage 8012 and returns to stage 8004, resuming the search for prefixes, and stage 8016 is bypassed (i.e., no data is delivered to a client application).

In stage 8014, a test is performed to determine if additional symbols of the payload exist by comparing the number of symbols that have been decoded with the expected number of symbols as given in the header length field 5006. If additional payload symbols exist, the decoding process of stage 8012 continues to the extent that there are additional symbols of the payload to decode. If an error is detected in stage 8012, the process returns to stage 8004 to search for a new interval prefix.

According to an embodiment, in stage 8014, when a determination is made that all symbols of the payload have been decoded, then the process moves to stage 8016, in which the resulting content is delivered to the client application. Following stage 8016, the process returns to stage 8010 and begins decoding the header of a following packet, assuming that the next packet immediately follows the end of the last decoded packet. According to an embodiment, timing synchronization is maintained after a first packet is successfully decoded, allowing the process to attempt to decode a header of a second packet that follows the first packet, based on known timing information. As such, the process avoids returning to stage 8004 to search for a packet header, greatly increasing the probability to successfully decode a plurality of sequential packets.

As described herein, a software application may be executed on a decoding device to allow a user to access and store content received from the content management system. The application may also allow a user to provide user preferences to the content management system. As is to be appreciated, the application may be structured in a number of ways.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium.

The operation and behavior of the embodiments may be described without specific reference to specific software code or specialized hardware components. The absence of such specific references is feasible, because it is clearly understood that artisans of ordinary skill would be able to design software and control hardware to implement the embodiments based on the specification with no more than reasonable effort and without undue experimentation.

Moreover, the processes associated with the disclosed embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semi-permanent, and/or semi-temporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network.

Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions.

It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed:

1. A mobile device configured to generate and transmit a human-inaudible acoustic signal that encodes a sequence of data symbols representing a binary message for delivery as audio content, the device comprising:
   an audio device; and
   a processor configured to perform the following operations:
      encoding the binary message into a sequence of data symbols, each data symbol selected from a group consisting of two or more data symbols, each data symbol associated with frequency characteristics;
      generating audio samples of a digitized version of the sequence of data symbols using the frequency characteristics associated with the symbols of the sequence of data symbols, wherein each data symbol in the sequence of data symbols is separated from the preceding and succeeding data symbols in the sequence of data symbols by a transition symbol, each transition symbol having a common frequency characteristic with the other transition symbols that is distinct from the data symbols; and
      controlling the audio device to generate and transmit the human-inaudible acoustic signal, based on the audio samples.

2. The device of claim 1, wherein the encoding comprises the use of one or more of forward error correction and cyclic redundancy coding.

3. The device of claim 1, wherein the data symbol sequence further comprises:
   prefix symbols representing a prefix of the data symbol sequence;
   first data content symbols representing a length of the data symbol sequence;
   second data content symbols representing error correction coding;
   third data content symbols representing the binary message; and
   transition symbols representing transition intervals between data symbols.

4. The device of claim 3, wherein:
   said data content symbols encode binary data values, wherein each binary data value is associated with respective frequency characteristics;
   said prefix symbols are associated with frequency characteristics distinct from the frequency characteristics associated with said data content symbols; and
   said transition symbols are associated with frequency characteristics distinct from the frequency characteristics associated with said prefix and said data content symbols.

5. The device of claim 3, wherein said transition intervals comprise smooth time dependent frequency changes that do not introduce human-audible harmonics.

6. A method of generating a human-inaudible acoustic signal that encodes a sequence of data symbols representing a binary message for delivery as audio content, the method comprising:
   encoding the binary message into a sequence of data symbols selected from a group consisting of two or more data symbols, each data symbol associated with frequency characteristics;
   generating audio samples of a digitized version of the sequence of data symbols using the frequency characteristics associated with the symbols of the sequence of data symbols, wherein each data symbol in the sequence of data symbols is separated from the preceding and succeeding data symbols in the sequence of data symbols by a transition symbol, each transition symbol having a common frequency characteristic with the other transition symbols that is distinct from the data symbols; and controlling the audio device to generate and transmit the human-inaudible acoustic signal, based on the audio samples.

7. The method of claim 6, wherein the encoding comprises the use of one or more of forward error correction and cyclic redundancy coding.

8. The method of claim 6, wherein the data symbol sequence further comprises:

prefix symbols representing a prefix of the data symbol sequence;

first data content symbols representing a length of the data symbol sequence;

second data content symbols representing error correction coding;

third data content symbols representing the binary message; and transition symbols representing transition intervals between data symbols.

9. The method of claim 8, wherein:

said data content symbols encode binary data values, wherein each binary data value is associated with respective frequency characteristics;

said prefix symbols are associated with frequency characteristics distinct from the frequency characteristics associated with said data content symbols; and said transition symbols are associated with frequency characteristics distinct from the frequency characteristics associated with said prefix and said data content symbols.

10. The method of claim 8, wherein said transition intervals comprise smooth time dependent frequency changes that do not introduce human-audible harmonics.

* * * * *